United States Patent [19]
Marterer

[11] 3,940,027
[45] Feb. 24, 1976

[54] DISPENSER FOR A BOTTLE TOP

[75] Inventor: Karl Marterer, Waldenhausen, Germany

[73] Assignee: Firma Rudolf Brand, Wertheim, Germany

[22] Filed: Apr. 5, 1974

[21] Appl. No.: 458,242

[30] Foreign Application Priority Data
Aug. 30, 1973 Germany............................ 2343687

[52] U.S. Cl. .............................................. 222/309
[51] Int. Cl.² .......................................... G01F 11/06
[58] Field of Search ........... 222/386, 440, 438, 435, 222/434, 444, 309, 47, 49, 50, 158, 384, 450

[56] References Cited
UNITED STATES PATENTS

| | | | |
|---|---|---|---|
| 2,792,157 | 5/1957 | Gilman | 222/309 |
| 2,798,647 | 7/1957 | Broadwin | 222/309 |
| 3,143,252 | 8/1964 | Shapiro | 222/309 |
| 3,211,335 | 10/1965 | Shapiro | 222/50 |
| 3,248,950 | 5/1966 | Pursell et al. | 222/309 X |
| 3,381,854 | 5/1968 | Blanchet | 222/309 X |
| 3,430,813 | 3/1969 | Gilmont | 222/309 X |
| 3,810,391 | 5/1974 | Suovaniemi | 222/309 X |

*Primary Examiner*—Stanley H. Tollberg
*Assistant Examiner*—Norman L. Stack, Jr
*Attorney, Agent, or Firm*—Robert H. Jacob

[57] ABSTRACT

Dispenser for a bottle top with a cylinder and a plunger that is adjustable relative to the cylinder for drawing up an adjustable quantity of liquid esp. reagent with a suction valve and a discharge valve and having a glass cylinder secured to a valve block which is threadedly received on a reagent bottle and where a cylinder sleeve slidably and rotably extends over the glass cylinder and is connected with the plunger which slides in the glass cylinder and where means are provided for adjusting the stroke of the plunger and to indicate the suction volume.

13 Claims, 8 Drawing Figures

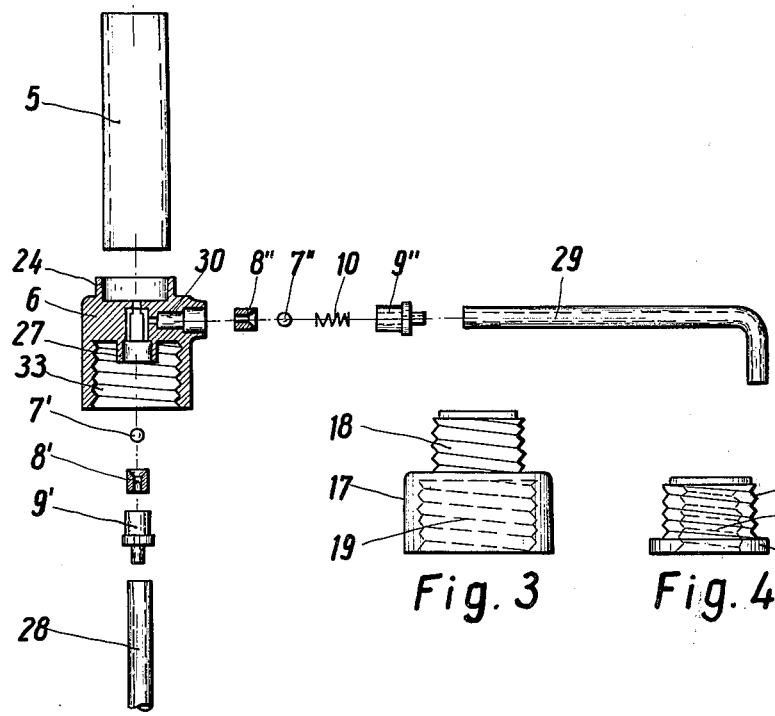

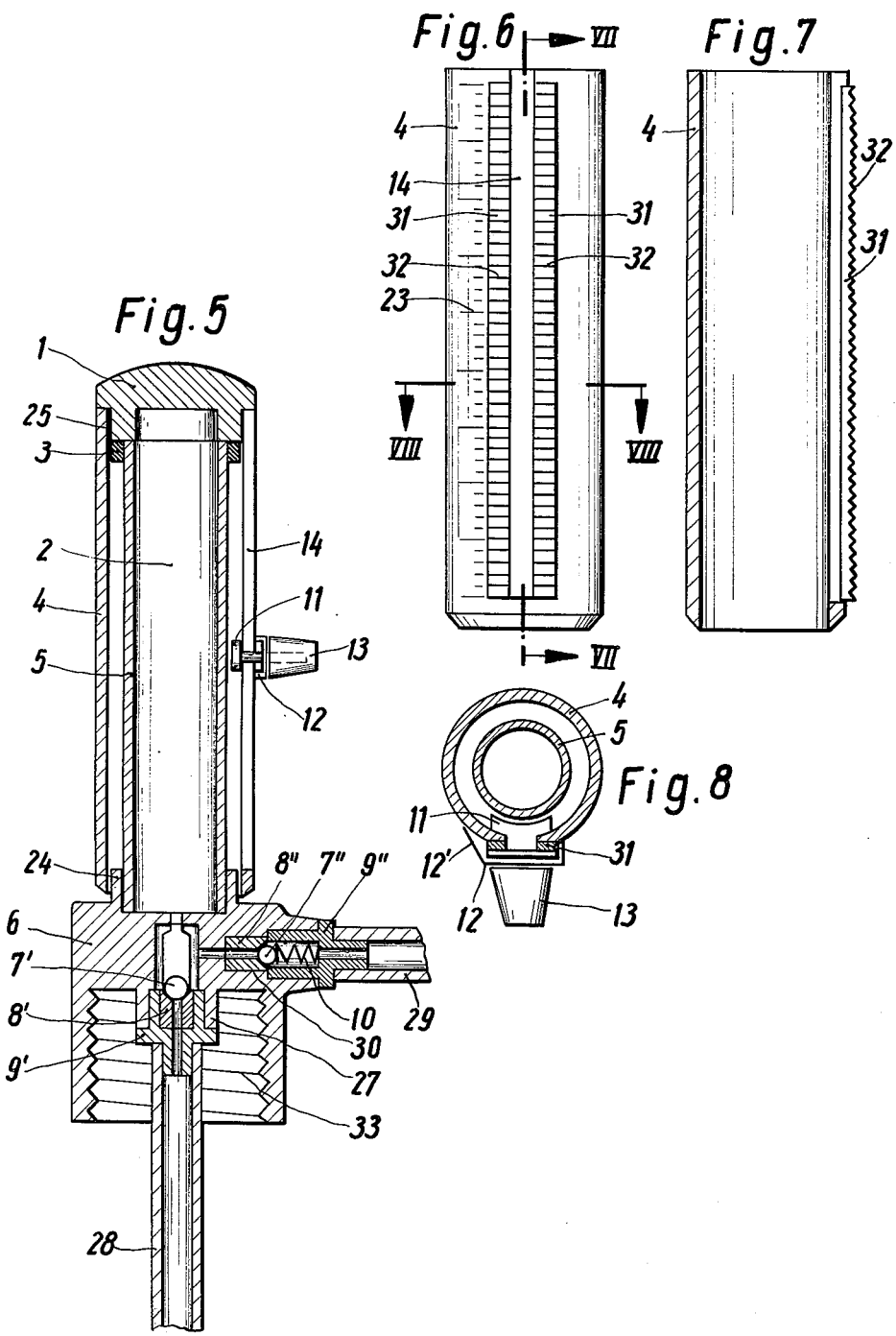

DISPENSER FOR A BOTTLE TOP

The invention concerns a bottle-top-reagent-dispenser having a plunger that is adjustable relative to the cylinder for drawing up an adjustable quantity of liquid (reagent) and having a suction and a discharge valve.

Dispensers are used for the rapid and exact dosing of reagents where the dosing is to be effected directly out of original bottles.

A number of dispensers or pipettors are already known which, however, do not satisfactorily meet the requirements of actual practice especially when dealing with aggresive or alcaline liquids. With dispensers of this type it is not only necessary that all parts coming into contact with the liquid to be dispensed are individually chemically resistant, but they they are selected and combined in a manner that the instrument mechanism and functional condition and measuring accuracy is not influenced by the liquids during or after a certain lifetime which as a rule is not observed in practice. Furthermore, high measuring accuracy and excellent reproducibility are required, as this are the main conditions for use of such dispensers, which are mainly used for dispensing reagents in clinical laboratories.

A further shortcoming of known dispensers is that after discharge of the drawn up volume of liquid a subsequent short dropping takes place that decreases the accuracy of measurement.

It is a main object of the invention to construct a liquid dispenser of the type explained above in a manner to avoid the shortcomings of the known devices and that it can be manipulated in a particularly simple manner also by unskilled persons and provides great accuracy and reliability, as well as chemical resistance and universal applicability as required e. g. for dispensing reagent in clinical laboratories. Another object is to provide a dispenser which is applicable for any bottles having screw cup closures of different size.

In accordance with the invention this problem is solved with a reagent dispenser for a bottle top of the type aforementioned essentially in that a glass cylinder is secured to a valve block which can be screwed into a bottle, so that it movably and rotatably passes over a cylindrical sleeve and is connected with a plunger that slides in the glass cylinder, and means are provided for the adjustment of the stroke of the plunger and for indication of the suction volume.

A construction that has particularly favorable chemical resistance qualities is obtained if, in accordance with one feature of the invention, the plunger consists at least partly of ceramic material and is coated with a thin layer of a FEP plastic material (Fluorethylenepolymer). The ceramic material beeing resistent and having a very low thermical expansion coefficient. The FEP layer enables the light sliding and tight sealing of the plunger in the glass cylinder. In this connection it is essential that not only each part of the dispenser itself is chemically resistant, but also the combination thereof. When the plunger and the cylinder both are made of glass, difficulties may arise due to changes of the surfaces, by attacking of certain liquids therefor the plunger becomes sticking in the glass cylinder.

For adjusting the volume it is advantageous if the cylinder has a contact ring which cooperates with an adjustable excursion stop in the cylinder sleeve. For this it is advantageous if in accordance with a further feature of the invention the cylinder sleeve has a longitudinal slot in which the adjustable excursion stop is arranged.

In accordance with a preferred embodiment of the invention the adjustable excursion stop is shaped as a segment and can be rested as desired by means of a arrestment screw at any point in the slot of the cylindrical sleeve.

Further features and advantages of the invention are explained more in detail with reference to the drawings which schematically illustrate embodiments and in which FIG. 1 is an exploded view of a bottle-top-dispenser in accordance with the invention, FIG. 2 is a modified example of an embodiment of a cylinder sleve with an excursion stop, FIG. 3 is a first embodiment of an adapter, FIG. 4 is an second embodiment of an adapter in accordance with the invention, FIG. 5 is a longitudinal cross-section of a dispenser in assembled condition, FIG. 6 is a further embodiment of a cylinder sleeve with two tooth tracks in a longitudinal view, FIG. 7 is a section through the cylinder sleeve along the section line VII—VII in FIG. 6, and FIG. 8 is a horizontal section through FIG. 6 along section line VIII—VIII.

FIGS. 1 and 5 show that the dispenser has a valve block 6 at the top of which a coaxial cylindrical recess 24 is provided in which a likewise coaxial tubular glass cylinder 5 is secured by pressing, if required with the aid of binding agents. This glass cylinder 5 is overlapped by a cylinder sleeve 4 that is movable longitudinally as well as rotatable relative to the glass cylinder 5. In the cylinder sleeve 4 a plunger 2 is coaxially disposed and secured by means of a plunger bearing 1. For this purpose the plunger is pressed in with its one end that in the drawing is at the top in a corresponding recess 25 in the cover-shaped plunger bearing 1, if need be also with the aid of binding agents and is firmly retained there. The plunger bearing 1 thus provided with plunger 2 is then secured at the upper end of the cylinder sleeve 4, for example by means of a threaded connection or a force fit.

The plunger 2 is provided with a thin coating of chemical resisting plastic material (FEP or similar material). This coating may be applied to plunger 2 as a layer pulled over as a shrinking PTFE-foil or moulded or sintered or sprayed on of FEP or applied mechanically resistent in any other manner. The glass cylinder 5 is equiped on its upper end with a plastic contact ring 3 pressed on while heated. The contact ring 3 has an outer diameter which is a little less than the inner diameter of the cylinder sleeve 4 so that the rotating and longitudinal sliding movements are not impeded. The cylinder sleeve 4 has a longitudinal slot 14 in which an adjustable excursion stop is provided. This excursion stop consists of an stop segment 11 which laterally of the longitudinal slot 14 reaches behind the wall of the cylinder sleeve, of a counter member 12 resting against the outer wall of the cylinder sleeve 4 and a arrestment screw 13 by means of which the stop segment 11 and the counter member 12 can be screwed together so that they may be arrested at any desired level of the longitudinal slot 14.

As shown particularly by FIG. 5, the cylinder sleeve 4 together with plunger 2 can be pulled out upwardly only until the stop segment 11 meets the contact ring 3 from the bottom. By these means the desired volume of liquid that has to be drawn into the glass cylinder 5 is determined.

The cylinder sleeve 4 is provided with a scale 23, preferably on one or both sides of the slot 14. For indicating the volume set up by means of the volume adjustment 11, 12, 13 a pointer 12' in provided. This pointer 12' may, for example, be in the form of an annular band that surrounds the cylinder sleeve on the outside.

In the valve block 6 a suction valve 7', 8', 9', and an outlet valve 7", 8", 9" is disposed. The suction valve connects via a filling cannula 28 the inner space of a bottle or of a container on which the dispenser in accordance with the invention is threadedly received, with the glass cylinder 5. During suction, i. e. as the plunger 2 is pulled up, a valve ball 7' rises from a valve seat 8' which has a conical seat for the valve ball 7' and frees the path for liquid flow trough the filling cannula 28, a valve cup 9', the valve sleeve 8' to the interior of the glass cylinder. The valve cap 9' which holds the valve seat sleeve 8' consisting of a hard resistent material i. g. glass or ceramic is held tightly in a corresponding recess 27 of the valve block 6 by suitable force fit.

As soon as the suction stroke is completed, the ball 7' having a specificweight higher than that of the liquid drops down due to its own weight onto the conical valve Seat 8' so that any back flow of the liquid drawn into the glass cylinder 5 is immediately terminated.

The outlet valve is disposed substantially horizontally on the valve block 6 and connects the inner space of the glass cylinder 5 with a discharge cannula 29 having the shape of an angular tube. It sonsists likewise of a valve seat sleeve 8" of glass or ceramic having a conical seat for a valve ball 7" and a valve cap 9". The valve seat sleeve 8" is placed into a corresponding recess 30 in the valve block and is secured from the outside against slipping out by the valve cup 9" that is securely mounted in the valve block 6. Furthermore, a valve pressure spring 10 of chemical resistent material is provided which on the one hand rests a-gainst the valve cap 9" and on the other hand against the valve ball 7" so that in nonloaded condition the valve ball 7" is always pressed against the conical valve seat of the valve seat sleeve 8". As the plunger 2 is pressed down, the pressure of the liquid presses and raises the valve ball 7" against the effect of spring 10 from the valve seat in the valve seat sleeve 8" and frees the path for the liquid to the discharge cannula 29.

As soon as the downward pressure of the plunger 2 is terminated, the valve ball 7" is again pressed by spring 10 onto the valve seat so that no undesired further dropping of the liquid through the valve 7", 8", 9" can occur after the discharging stroke is terminated.

FIG. 2 illustrates a modified embodiment of a volume adjustment device. For this purpose the longitudinal slot in the cylinder sleeve 4 is provided with teeth 15 or a toothed bar. The teeth cooperate, for example with a toothed excursion stop 16 on the stop segment 11. FIGS. 6, 7, 8 illustrate a further embodiment where toothed bars 31 are provided on both sides of the longitudinal slot 14, the tooth profile 32 of which projects forwardly. As reflected by the sectional drawing FIG. 8, the stop segment 11 and the arrestment screw are constructed in the same manner as in FIGS. 1 and 5. The counter part 12 has in addition a toothed profile on its inside corresponding to the toothed profile 32 so that the excursion stop can always be arrested accurately in positions that can be reproduced corresponding to the divisions of the toothed profile 32. Also here, a pointer 12' is provided on the counter member which likewise indicates the set up volume on the scale 23. The division of the tooth profile and the division of the scale are set up un such a manner that they correspond accurately in relation to the desired volume.

The valve block 6 is provided in a known manner with an inner thread 33 by means of which the dispenser can be screwed onto the outer thread of an associated bottle. The larger number of bottles which are on the market make it necessary to provide means for adaptation to different thread diameters. This is solved in accordance with the invention by thread adapters.

FIG. 3 illustrates a first embodiment for changing over to a larger bottle thread. An adapter 17 has an outer thread 18 to be threadedly received in the inner thread 33 of the valve block 6 and has an inner thread 19 to be screwed onto an associated bottle.

For changing over to a smaller bottle neck diamter, it is advantageous to provide an adaptor shaped as a double thread 20 having an inner thread 21 for receiving the outer thread of the bottle neck and a larger outer thread 22 to be screwed into the inner thread 33 of the valve block 6. In the event that the difference between the diameter of the two threads is so small that there remains no sufficient wall portion, the threads 21 and 22 can be provided in axially displaced positions.

Depending on the existing conditions, longer or shorter filling cannulas may be connected to the lower valve cap 9' and a tube or a bent discharge cannula or the like to the valve cap 9" of the outlet valve. Filling and discharge cannulas and tubules consist preferably of PTFE plastic material or the like.

The invention is not limited to the embodiments illustrated and described, but it encompasses any modifications, as well as all partial and sub-combinations having the characteristics and measures described and-/or illustrated.

I claim:

1. Liquid dispenser for bottle top having a cylinder and a plunger adjustable relative to said cylinder for drawing up an adjustable quantity of liquid such as reagent comprising said cylinder, a valve block including a suction valve and a discharge valve connected with said cylinder, said valve block being adapted to be threadedly mounted on a bottle, a cylinder sleeve provided with a scale received concentrically over said cylinder and being slidable and rotatable relative to said cylinder and being connected with said plunger, said plunger being slidable in said cylinder, and means being provided for adjusting the stroke of said plunger to determine and indicate a desired volume to be dispensed, said means comprising a contact ring fixed on said cylinder, and an adjustable excursion stop in said cylinder sleeve for cooperating with said ring, said cylinder sleeve defining a longitudinal slot, said adjustable excursion stop being disposed in said slot.

2. Dispenser in accordance with claim 1, where said plunger is made of ceramic material and coated with chemically and mechanically resistant plastic.

3. Dispenser in accordance with claim 1, comprising a contact ring on said cylinder, and an adjustable excursion stop in said cylinder sleeve for cooperating with said ring.

4. Dispenser in accordance with claim 1 where said cylinder sleeve defines a longitudinal slot, said adjustable excursion stop being disposed in said slot.

5. Dispenser in accordance with claim 1 where said adjustable excursion stop is in the form of a segment and an arrestment screw is provided for adjusting said excursion stop.

6. Dispenser in accordance with claim 1 where said cylinder sleeve is provided with toothed strips and a toothed excursion stop for cooperating with said abutment.

7. Dispenser in accordance with claim 6 where said toothed strips are disposes adjacent the edges of said slot.

8. Dispenser in accordance with claim 1 having a scale on the outer wall of said cylinder sleeve.

9. Dispenser in accordance with claim 1 where said suction valve is a ball weight valve.

10. Dispenser in accordance with claim 1 where said outlet valve is a spring-loaded ball.

11. Dispenser in accordance with claim 1 where said valve block is connected with a thread adapter, having an outer threaded portion for securement in said valve block and an inner threaded portion adapted to be threadedly received on the neck of a bottle.

12. Dispenser in accordance with claim 11 where said adapter is in the form of a telescoping ring.

13. Dispenser in accordance with claim 11 where said adapter is in the form of a sleeve having inner and outer threads.

* * * * *